United States Patent
Kasubuchi et al.

(10) Patent No.: US 7,765,439 B2
(45) Date of Patent: Jul. 27, 2010

(54) TRACEABILITY MANAGEMENT APPARATUS, STORAGE MEDIUM STORING PROGRAM, AND TRACING METHOD

(75) Inventors: Kiyotaka Kasubuchi, Kyoto (JP); Hiroshi Yamamoto, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 426 days.

(21) Appl. No.: 11/878,677

(22) Filed: Jul. 26, 2007

(65) Prior Publication Data

US 2008/0040633 A1 Feb. 14, 2008

(30) Foreign Application Priority Data

Aug. 9, 2006 (JP) ............................. 2006-244191

(51) Int. Cl.
*G06F 11/00* (2006.01)

(52) U.S. Cl. .......................................... 714/48; 714/38

(58) Field of Classification Search ........................ None
See application file for complete search history.

(56) References Cited

U.S. PATENT DOCUMENTS

| | | | |
|---|---|---|---|
| 6,279,125 B1* | 8/2001 | Klein ......................... | 714/38 |
| 6,338,149 B1* | 1/2002 | Ciccone et al. ............... | 714/38 |
| 6,718,489 B1* | 4/2004 | Lee et al. ...................... | 714/43 |
| 7,111,205 B1* | 9/2006 | Jahn et al. ..................... | 714/47 |
| 7,555,683 B2* | 6/2009 | Gronemeyer et al. ......... | 714/55 |
| 2006/0224930 A1* | 10/2006 | Bantz et al. ................... | 714/48 |

FOREIGN PATENT DOCUMENTS

| | | |
|---|---|---|
| JP | 10-83322 | 3/1998 |
| JP | 2003-241996 | 8/2003 |

* cited by examiner

*Primary Examiner*—Michael C Maskulinski
(74) *Attorney, Agent, or Firm*—McDermott Will & Emery LLP

(57) ABSTRACT

A hardware-information acquisition part, in the case of modification or addition to hardware configurations of semiconductor manufacturing devices to be managed, obtains that update information. To check the range of influence of a failure, as a first step, a software-condition conforming device extracting part extracts devices which have installed software related to the failure. Then, a hardware-condition conforming device extracting part determines, according to the information obtained by the hardware information acquisition part, whether the extracted devices satisfy hardware conditions under which the failure occurs, and if so, extracts those devices as the ones affected by the failure. Accordingly, even in the case of modification or addition to hardware, it is possible to ensure traceability of failures or requirements and thereby to identify the range of influence of failures with efficiency and reliability.

6 Claims, 9 Drawing Sheets

FIG. 3A

| INSTALLATION HISTORY TABLE | | | T1 |
|---|---|---|---|
| SERIAL NUMBER | APPLICATION VERSION NUMBER | DATE AND TIME | |
| 12345 | A1 | 2006/4/28 | |
| 12345 | A2 | 2006/5/8 | |
| ⋮ | ⋮ | ⋮ | |

FIG. 3B

| HARDWARE DETAILED INFORMATION TABLE | | | | T2 |
|---|---|---|---|---|
| SERIAL NUMBER | RESOURCE | RESOURCE VALUE | DATE AND TIME | |
| 12345 | MEMORY_SIZE | 512 | 2004/2/1 | |
| 12345 | CPU_TYPE | P3 | 2004/2/1 | |
| 12345 | CPU_TYPE | P4 | 2005/2/1 | |
| 12345 | CPU_CLOCK | 1000 | 2004/2/1 | |
| 12345 | CPU_CLOCK | 2700 | 2005/2/1 | |
| ⋮ | ⋮ | ⋮ | ⋮ | |

FIG. 4A

| FAILURE TABLE | | | | |
|---|---|---|---|---|
| FAILURE NUMBER | DATE AND TIME OF OCCURRENCE | HARDWARE CONDITION NUMBER | FAILURE-CONTAINING MODULE VERSION NUMBER | FAILURE-CORRECTED MODULE VERSION NUMBER |
| 9001 | 2006/5/10 | 10 | M3 | M4 |
| 9000 | 2005/12/1 | 3 | M1 | M2 |
| ⋮ | ⋮ | ⋮ | ⋮ | ⋮ |

FIG. 4B

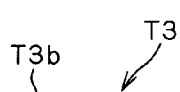

| REQUIREMENT TABLE | | | |
|---|---|---|---|
| REQUIREMENT NUMBER | DATE AND TIME OF OCCURRENCE | HARDWARE CONDITION NUMBER | CORREPSONDING MODULE VERSION NUMBER |
| 6001 | 2006/6/1 | 11 | M3 |
| 6000 | 2005/10/1 | 3 | M1 |
| ⋮ | ⋮ | ⋮ | ⋮ |

FIG. 4C

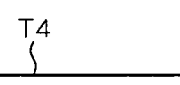

| HARDWARE CONDITION TABLE | | | |
|---|---|---|---|
| HARDWARE CONDITION NUMBER | RESOURCE | RESOURCE VALUE | COMPARISON OPERATOR |
| ⋮ | ⋮ | ⋮ | ⋮ |
| 10 | MEMORY_SIZE | 512 | <= |
| 11 | CPU_TYPE | P3 | = |
| ⋮ | ⋮ | ⋮ | ⋮ |

| MODULE VERSION TABLE ||||| 
|---|---|---|---|---|
| MODULE VERESION NUMBER | MODULE | MODULE VERSION | DATE AND TIME | PARENT MODULE VERSION NUMBER |
| M1 | GUI | 5.00 | 2006/5/8 | |
| M2 | GUI | 5.02 | 2006/5/10 | M1 |
| M3 | DB | 5.00 | 2006/5/8 | |
| M4 | DB | 5.01 | 2006/5/10 | M2 |
| ⋮ | ⋮ | ⋮ | ⋮ | ⋮ |

| APPLICATION VERSION TABLE ||||
|---|---|---|---|
| APPLICATION VERSION NUMBER | APPLICATION VERSION | DATE AND TIME | PARENT APPLICATION VERSION NUMBER |
| A1 | 1.00 | 2006/5/8 | |
| A2 | 1.10 | 2006/5/10 | A1 |
| ⋮ | ⋮ | ⋮ | ⋮ |

| VERSION ASSOCIATION TABLE ||
|---|---|
| APPLICATION VERSION NUMBER | MODULE VERSION NUMBER |
| A1 | M1 |
| A1 | M3 |
| A2 | M2 |
| A2 | M4 |

TRACEABILITY MANAGEMENT APPARATUS, STORAGE MEDIUM STORING PROGRAM, AND TRACING METHOD

BACKGROUND OF THE INVENTION

1. Field of the Invention

The present invention relates to traceability of failures blamed on hardware, and traceability of functional requirements from software.

2. Description of the Background Art

In recent years, it has become increasingly significant for manufacturers and sellers to ensure traceability of their own manufactured and sold products. For example if adequate traceability of sold products is not provided at the occurrence of a failure in their own manufactured and sold products, manufacturers and sellers cannot identify the range of influence of the failure without delay and thus cannot take speedy action such as issuing an alert to users of defective products or withdrawing defective products.

In manufacture and sales of software-installed computer devices, ensuring traceability of sold products is also important. For example, when a failure such as a bug is found in software installed in computer devices, it will be difficult to speedily identify the range of influence of that failure (that is, to speedily identify which computer devices will be affected by the failure) if traceability is not provided. This can cause serious damage.

Now, some failures in software occur under certain hardware conditions (for example, a failure occurring only with a specific type of CPUs, or a failure occurring only at a memory size of a predetermined value or less). For such failures, it is necessary to keep hardware information for each computer device in order to identify the range of influence of the failures with accuracy.

Some software (for example, software necessitating a specific CPU or a memory size of a predetermined value or more for proper functioning) requires certain hardware conditions for execution of instructions or the like described therein. For such functional requirements from software, it is again necessary to keep hardware information for each computer device in order to identify devices which satisfy the functional requirements.

Conventionally, such a structure has been employed that a model number is given to each type of hardware and is used for management of hardware information, whereby traceability of computer devices is ensured. In such a management method, for example when a failure occurring only with a specific type of CPUs is found in software, the type of a CPU in a computer is identified by the model number of the computer, and it is determined whether or not the computer is affected by that failure (for example, such a method is disclosed in Japanese Patent Application Laid-open No. 10-83322).

However since computer device hardware generally includes components that can be modified or added, the hardware configurations of computer devices are not always in their initial states (i.e., in the state of device configuration defined by the model number) and can be dynamically modified from the initial states. Specifically, in the case of modification or addition to hardware components of a computer device (for example, exchange of a CPU or motherboard, or memory expansion), the actual hardware configuration of that computer device does not match the hardware configuration defined by the model number.

Accordingly, the conventional methods of managing hardware information by using the model number no loner provide proper traceability of devices whose hardware configurations have been subjected to modification or addition. Therefore, it is impossible either to properly identify the range of influence of a failure or to properly identify hardware that satisfies functions required by software.

SUMMARY OF THE INVENTION

The present invention is directed to a traceability management apparatus for providing traceability of a plurality of computer devices including hardware components that can be modified or added.

According to one aspect of the present invention, the traceability management apparatus comprises the following: a software information acquisition part for acquiring installation history of software for each of the plurality of computer devices; a hardware information acquisition part for acquiring update information about the hardware components for each of the plurality of computer devices; a first device extracting part for, to trace the range of influence of a failure in software, extracting a device which has installed software containing the failure from the plurality of computer devices; and a second device extracting part for extracting a device which satisfies a hardware condition under which the failure occurs from the devices which have installed software containing the failure, thereby to identify a failure-affected computer device.

Since the update information about the hardware components of computer devices is obtained, even in the case of modification or addition to hardware, traceability of the computer devices can be ensured with reliability. This allows efficient and reliable identification of the range of influence of failures blamed on hardware conditions.

According to another aspect of the present invention, the traceability management apparatus comprises the following: a software information acquisition part for acquiring installation history of software for each of the plurality of computer devices; a hardware information acquisition part for acquiring update information about the hardware components for each of the plurality of computer devices; a first device extracting part for, to trace the range that satisfies a functional requirement from software, extracting a device which has installed software related to the functional requirement from the plurality of computer devices; and a second device extracting part for extracting a device which satisfies a hardware condition required by the software from the devices which have installed software related to the functional requirements, thereby to identify a requirement-satisfying computer device.

Since the update information about the hardware components of computer devices is obtained, even in the case of modification or addition to hardware, traceability of the computer devices can be ensured with reliability. This allows efficient and reliable identification of the range that satisfies functional requirements.

The present invention is also directed to a computer-readable storage medium storing a program for a traceability management apparatus for providing traceability of a plurality of computer devices including hardware components that can be modified or added.

The present invention is also directed to a tracing method for tracing a failure in software that is installed on a plurality of computer devices including hardware components that can be modified or added.

The present invention is also directed to a tracing method for tracing a functional requirement from software that is installed on a plurality of computer devices including hardware components that can be modified or added.

Therefore, it is an object of the present invention to provide a traceability management apparatus, a tracing method, and a program that, even in the case of modification or addition to hardware, provide traceability of failures and requirements and thereby allow efficient and reliable identification of the range of influence of failures and the range that can satisfy functional requirements.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3A shows the structure of an installation history table by way of example;

FIG. 3B shows the structure of a hardware detailed information table by way of example;

FIG. 4A shows the structure of a failure table by way of example;

FIG. 4B shows the structure of a requirement table by way of example;

FIG. 4C shows the structure of a hardware condition table by way of example;

FIG. 5A shows the structure of a module version table by way of example;

FIG. 5B shows the structure of an application version table by way of example;

FIG. 5C shows the structure of a version association table by way of example;

DESCRIPTION OF THE PREFERRED EMBODIMENTS

1. Configuration

Figure 1:
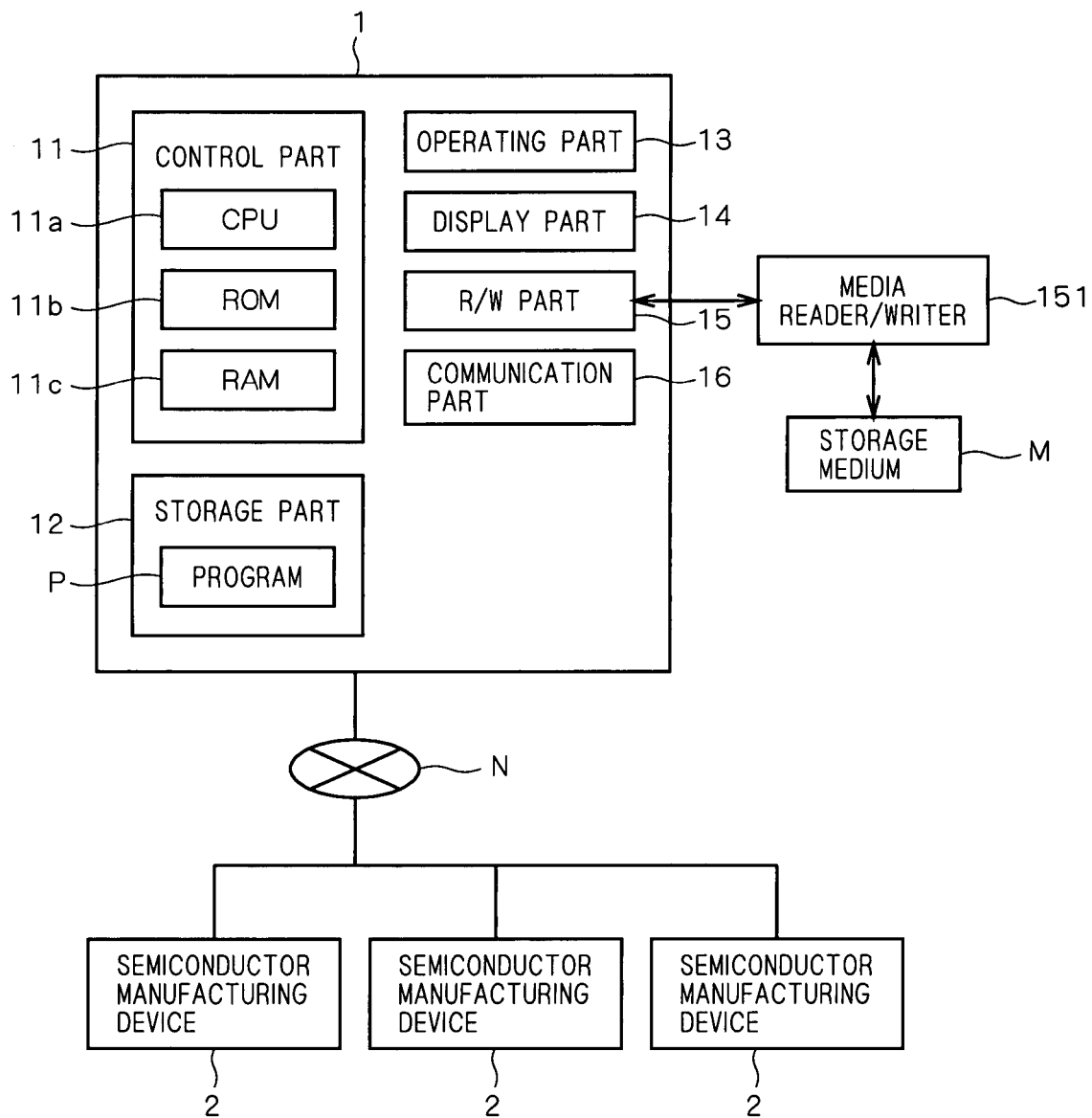
FIG. 1 shows a configuration of a traceability management apparatus according to one preferred embodiment of the present invention.

FIG. 1 shows a configuration of a traceability management apparatus 1 according to a preferred embodiment of the present invention. The traceability management apparatus 1 has the function of ensuring traceability of devices to be managed, and at the occurrence of a failure in software, tracing and extracting devices which are affected by the failure (in other words, checking the range of influence of the failure); and the function of, for functional requirements from software, tracing and extracting devices which satisfy the functional requirements (in other words, checking the range that can satisfy the requirements). These functions are hereinafter referred to as a "failure/requirement traceability function."

<1-0. Configuration of Device to be Managed>

The traceability management apparatus 1 exercises management of computer devices which include hardware components that can be modified or added, and software components (modules) that can be modified or added. The following description explains the case where the traceability management apparatus 1 exercises management of semiconductor manufacturing devices 2 which execute various processing steps in the manufacture of substrates (more specifically, semiconductor substrates, glass substrates for liquid crystal display, glass substrates for photomasks, substrates for optical disks, or the like).

<Software Configuration>

The semiconductor manufacturing devices 2 have installed thereon software (application software) for controlling each component of hardware, and accordingly function as devices capable of performing predetermined process on substrates. On version up of application software, a new version of application software is installed (updated) onto each of the semiconductor manufacturing devices 2 by an operator.

As will be described in detail later, the traceability management apparatus 1 manages information about software that has been installed on each of the semiconductor manufacturing devices to be managed (refer to an installation history table T1 (in FIG. 3A)). Especially, when a new version of application software is installed on the semiconductor manufacturing devices 2, the traceability management apparatus 1 acquires that information (installation history information).

Application software consists of a plurality of (for example, several tens to several hundreds) software components (modules). These modules each are upgraded to newer versions as appropriate through modification or enhancement. That is, single application software consists of a plurality of software components (modules) that can be modified or added.

As will be described in detail later, the traceability management apparatus 1 manages version information about each module, version information about each application software, and information about versions of modules included in each version of application software (refer to a module version table T5 (in FIG. 5A), an application version table T6 (in FIG. 5B), and a version association table T7 (in FIG. 5C)).

<Hardware Configuration>

Hardware of the semiconductor manufacturing devices 2 consists of a combination of a plurality of hardware components. Hereinafter, the hardware components are referred to as "resources."

Resources include those that can be modified or added. Resources that can be modified or added are for example such as optional or selective parts that are installed on each order from the user (e.g., an optionally installed sensor), or parts that can be exchanged or added (such as a CPU or a memory) or the like. Thus, even hardware with the same model number does not always contain completely the same parts (in other words, the resource values of each resource do not always completely agree with each other). Also, there is no guarantee that the hardware configuration will be fixedly kept in its shipment state (in other words, the resource values can be dynamically changed from their shipment values).

As will be descried in detail later, the traceability management apparatus 1 manages information about hardware configuration for each of the semiconductor manufacturing devices 2 to be managed (refer to a hardware detailed information table T2 (in FIG. 3B)). Especially, when modification or addition is made to the hardware configuration of each of the semiconductor manufacturing devices 2, the traceability management apparatus 1 acquires that information (more specifically, the resource values of resources related to the modification or addition). That is, even in the case of modification or addition to the hardware configurations of the semiconductor manufacturing devices 2 to be managed, the traceability management apparatus 1 is capable of maintaining proper hardware information that reflects information about modification or addition.

<1-1. Configuration of Traceability Management Apparatus>

The traceability management apparatus 1 is achieved by computer. More specifically, the traceability management apparatus 1 mainly comprises a control part 11 composed of a CPU 11a, a ROM 11b, and a RAM 11c and for implementing each function to be described later; a storage part 12 for storing a program P and the like for causing the computer to function as the traceability management apparatus 1; an operating part 13, such as a mouse or a keyboard, for allowing the operator to input various instructions; a display part 14 such as a display; a R/W part 15 composed of a hard disk or the like and for reading/writing data from/to a storage medium M via a media reader/writer 151; and a communication part 16 which is an interface for transferring data to and from other devices on a network N.

<1-2. Configuration Related to Failure/Requirement Traceability>

Figure 2:
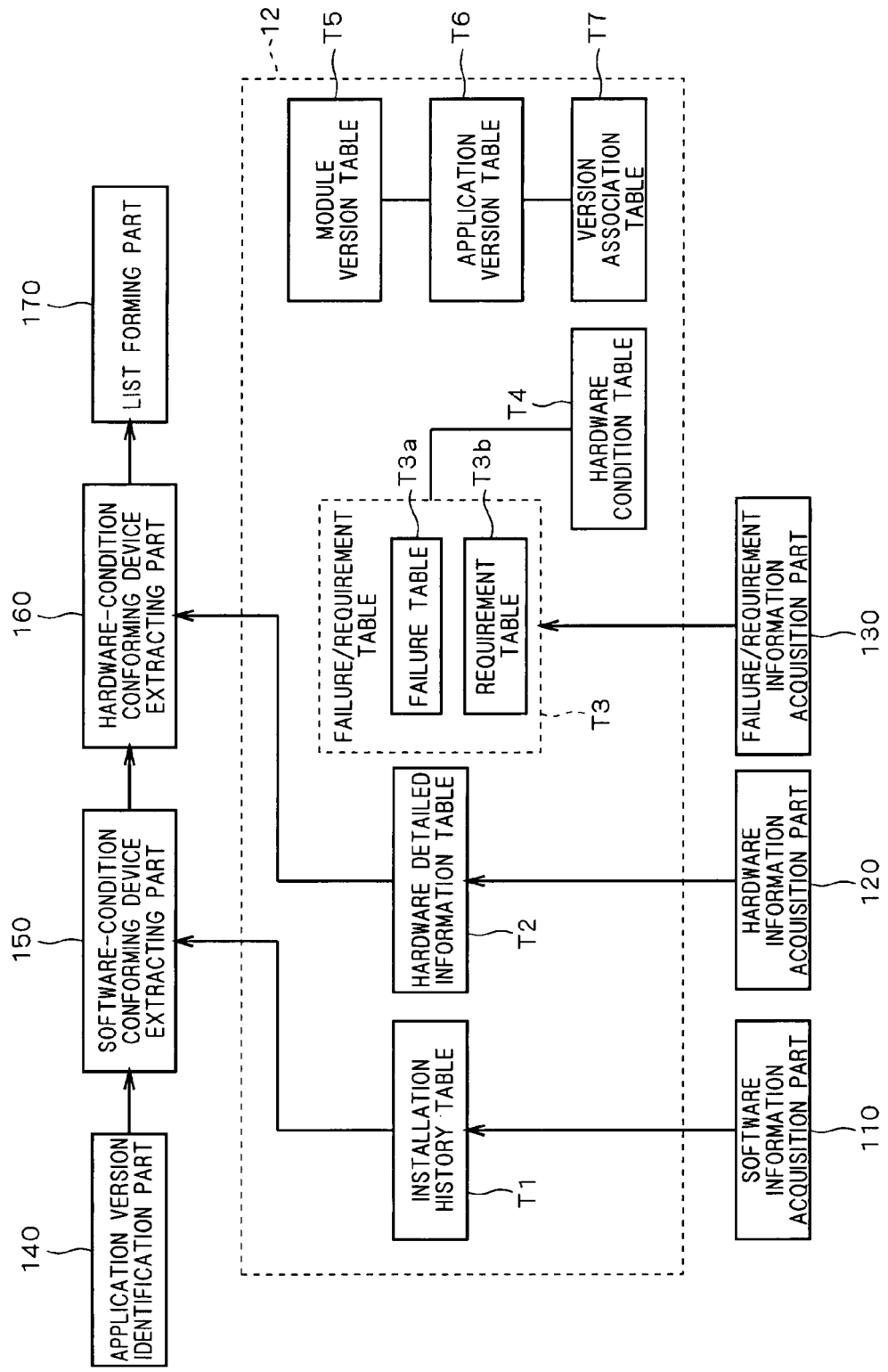
FIG. 2 illustrates a configuration related to a failure/requirement traceability function.

FIG. 2 illustrates a configuration related to the failure/requirement traceability function.

The traceability management apparatus 1 assigns an individual serial number for identifying each device to each of the semiconductor manufacturing devices 2 to be managed, and controls each device using these serial numbers.

The traceability management apparatus 1 has a configuration related to the failure/requirement traceability function, which comprises a software information acquisition part 110, a hardware information acquisition part 120, a failure/requirement information acquisition part 130, an application version identification part 140, a software-condition conforming device extracting part 150, a hardware-condition conforming device extracting part 160, and a list forming part 170. These parts are components which are implemented by the control part 11 executing a predetermined program P stored in the storage part 12. The storage part 12 in the traceability management apparatus 1 stores tables T1 to T7 that are referred to for ensuring traceability of devices to be managed and checking the range of influence of a failure or the range that can satisfy functional requirements.

The software information acquisition part 110, upon installation of a new version of application software onto the semiconductor manufacturing devices 2 to be managed, acquires that installation history information (more specifically, an application version number of installed software, and the date and time of the installation). The application version number is the number assigned to each application version. A correspondence between the application versions and the application version numbers is stored in the application version table T6 (FIG. 5B).

The installation history information may be obtained over the network N from the semiconductor manufacturing devices 2 on which application software has been installed, or may be obtained through reading from the storage medium M which stores the installation history information. Or the configuration may be such that the operator may manually input the installation history information through the operating part 13 for acquiring the installation history information based on the manual input.

The information obtained by the software information acquisition part 110 is associated with the serial numbers of the semiconductor manufacturing devices 2 and stored in the installation history table T1 (FIG. 3A).

<Installation History Table T1>

Referring to FIG. 3A, the installation history table T1 is a table for managing installation history information about the semiconductor manufacturing devices 2 to be managed. The installation history table T1 contains fields for "serial number," "application version number," and "date and time."

For example when a version 1.10 of application software (i.e., whose application version number is "A2" (see FIG. 5B)) is installed on the semiconductor manufacturing device 2 whose serial number is "12345" on May, 8, 2006, the software information acquisition part 110 acquires, as the installation history information, the serial number "12345" of the semiconductor manufacturing device 2, the date and time "2006/5/8" of the installation, and the application version number "A2" of the installed application software. The acquired installation history information is stored in the fields of "date and time" and "application version number" in the installation history table T1 in association with the serial number "12345" of the semiconductor manufacturing device 2.

Referring back to FIG. 2, the hardware information acquisition part 120 acquires update information in the case of modification or addition to the hardware configuration of the semiconductor manufacturing devices 2 to be managed.

A more specific description of the update information about the hardware configuration is given. The traceability management apparatus 1 manages hardware information on the semiconductor manufacturing devices 2 to be managed on a resource basis. Specifically, the traceability management apparatus 1 holds information (resource values) giving specifics about each of all the resources configuring hardware, thereby to manage information about the whole hardware configuration.

Thus, the hardware information acquisition part 120, in the case of modification or addition to the hardware configurations of the semiconductor manufacturing devices 2 to be managed, acquires resources related to the modification or addition, resource values after the modification or addition, and the date and time of the modification or addition as the update information.

The update information about hardware configuration may be obtained over the network N from the semiconductor manufacturing devices 2 whose hardware has been modified or added, or may be obtained through reading from the storage medium M which stores the hardware update information. Or the configuration may be such that the operator may manually input the hardware update information through the operating part 13 for acquiring the update information based on the manual input.

Initial information about the hardware configurations of the respective semiconductor manufacturing devices 2 may be obtained in the same way as the update information, or may be obtained using the model number of each device. Specifically, the configuration may be such that the storage part 12 previously stores a table for storing the model numbers of the respective semiconductor manufacturing devices 2 in association with serial numbers and a table for storing hardware information (more specifically, resource values) about each model number, which tables are referred to for acquiring initial information about each hardware configuration.

The information obtained by the hardware information acquisition part 120 is associated with the serial numbers of the semiconductor manufacturing devices 2 and stored in the hardware detailed information table T2 (FIG. 3B).

<Hardware Detailed Information Table T2>

Referring to FIG. 3B, the hardware detailed information table T2 is a table for managing hardware information about the semiconductor manufacturing devices 2 to be managed, and more specifically a table for managing resource values of the respective resources in the semiconductor manufacturing devices 2 to be managed. The hardware detailed information table T2 contains fields for "serial number," "resource," "resource value," and "date and time."

For example when 512 MB of memory is added on the semiconductor manufacturing device 2 whose serial number is "12345" on Feb. 1, 2004, the hardware information acquisition part 120 acquires, as update information about hardware configuration, the serial number "12345" of the semiconductor manufacturing device 2, the date and time "2004/2/1" of the modification or addition, the resource "MEMORY_SIZE" related to the modification or addition, and the resource value "512." The acquired information is stored in the fields of "date and time," "resource," "resource value," in the hardware detailed information table T2 in association with the serial number "12345" of the semiconductor manufacturing device 2. This reflects the modification or addition made to hardware to the hardware detailed information table T2 which thus can hold proper hardware information that conforms to the hardware configuration after the modification or addition.

Referring back to FIG. 2, the failure/requirement information acquisition part 130 acquires information about failures in software or functional requirements from software. Failures in software or functional requirements from software result from specific modules included in application software. In other words, failures or functional requirements link to specific modules.

Information about failures or requirements, more specifically, includes the date and time of occurrence of failures or requirements, a hardware condition number indicating a hardware condition under which a failure occurs (or under which software functions properly), and information for identifying a module version related to failures or requirements (more specifically, the number of a module version which contains a failure, or in the case where a failure has been corrected, the number of a module version in which a failure is corrected, or the number of a module version which issues a requirement). A concrete hardware condition represented by each hardware condition number is described in the hardware condition table T4 (FIG. 4C). For example, the example of FIG. 4C shows that the hardware condition number "10" indicates a hardware condition that the memory size is 512 MB or less. The module version number is the number assigned to each module version. A correspondence between the module versions and the module version numbers is stored in the module version table T5 (FIG. 5A).

The information about failures or requirements may be obtained from communication terminal equipment which is connected over the network N, or may be obtained through reading from the storage medium M which stores the information about failures or requirements. Or the configuration may be such that the operator may manually input the information about failures or requirements through the operating part 13 for acquiring the information about failures or requirements based on the manual input. The information obtained by the failure/requirement information acquisition part 130 is stored in a failure/requirement table T3.

<Failure/Requirement Table T3>

Referring to FIGS. 4A and 4B, the failure/requirement table T3 is a table for managing information about failures in software and functional requirements from software. The traceability management apparatus 1 has, as the failure/requirement table T3, two kinds of tables: a failure table T3a and a requirement table T3b.

<Failure Table T3a>

The failure table T3a contains fields for "failure number," "date and time of occurrence," "hardware condition number," "failure-containing module version number," "failure-corrected module version number."

For example when a failure occurs in the module version whose module version number is "M3" on May 10, 2006 and it is found that this failure occurs under the hardware condition that the memory size is 512 MB or less, the failure/requirement information acquisition part 130 acquires the date and time "2006/5/10" of occurrence of the failure, the hardware condition number "10" that defines the memory size of 512 MB or less, and the module version number "M3" indicating the module version which contains the failure. The acquired information is stored in the fields of "date and time of occurrence," "hardware condition number," and "failure-containing module version number" in the failure table T3a in association with a failure number "9001." If this failure is corrected in the module version whose module version number is "M4," the failure/requirement information acquisition part 130 acquires the module version number "M4" indicating the module version in which the failure is corrected. The acquired information is stored in the field of "failure-corrected module version number" in the failure table T3a in association with the failure number "9001."

<Requirement Table T3b>

The requirement table T3b contains fields for "requirement number," "date and time of occurrence," "hardware condition number," and "corresponding module version number."

For example when the module version whose module version number is "M3" issues a functional requirement that requires a CPU of the type P3 as a hardware condition on Jun. 1, 2006, the failure/requirement information acquisition part 130 acquires the date and time "2006/6/1" of issuance of the requirement, the hardware condition number "11" that defines CPUs of the type P3, and the module version number "M3" indicating the module version which has issued the requirement. The acquired information is stored in the fields of "date and time of occurrence," "hardware condition number," and "corresponding module version number" in the requirement table T3b in association with a requirement number "6001."

<Hardware Condition Table T4>

Now, the hardware condition table T4 will be described. As above described, the hardware condition table T4 is a table that defines concrete hardware conditions represented by the hardware condition numbers.

The hardware condition table T4 contains fields for "hardware condition number," "resource," "resource value," and "comparison operator."

The "resource" field describes a type of resource to be conditioned; the "resource value" field describes required resource contents; and the "comparison operator" field describes an operator (such as "=," "<=," or ">=") for use in a comparison expression for comparing resource values. For example, in the hardware condition table T4 illustrated in FIG. 4C, the hardware condition number "10" defines a hardware condition that the resource "MEMORY_SIZE" should satisfy a resource value of "512" MB or more ("<=").

Referring back to FIG. 2, the application version identification part 140 identifies the application version number related to failures or requirements. More specifically, the application version identification part 140 extracts a module version related to a failure or requirement from the module versions stored in the module version table T5 and further extracts, as the application version related to the failure or requirement, an application version which includes the module version related to the failure or requirement from the application versions stored in the application version table T6.

<Module Version Table T5>

The module version table T5 is a table that defines each module version by the module version number. In the production of a new version of module, information about that module version is acquired by a module version information acquisition part not shown and is stored in the module version table T5 in association with a predetermined module version number.

The module version table T5 contains a "module version number" field; a "module" field describing the type of an updated module; a "module version" field describing module version information; a "date and time" field describing the date and time of issuance of that module version; and a "parent module version number" field describing, if that module version has a parent module version, the version number of that parent module.

<Application Version Table T6>

The application version table T6 is a table that defines each application version by the application version number. In the production of a new version of application, information about that application version is acquired by an application version information acquisition part not shown and is stored in the application version table T6 in association with a predetermined application version number.

The application version table T6 contains an "application version number" field; an "application version" field describing application version information; a "date and time" field describing the date and time of issuance of that application version; and a "parent application version number" field describing, if that application version has a parent application version, the version number of that parent application.

<Version Association Table T7>

The version association table T7 is a table showing a correspondence between the module version numbers and the application version numbers (that is, a correspondence between application versions and module versions included in the application versions). For example, the example of FIG. 5C shows that the application version number "A1" includes the module version number "M1."

Referring back to FIG. 2, the software-condition conforming device extracting part 150 extracts a semiconductor manufacturing device 2 which has installed an application version including a version of module that results in the cause of a failure or that issues a functional requirement. More specifically, the software-condition conforming device extracting part 150 extracts a device which has installed application software related to a failure or requirement from the semiconductor manufacturing devices 2 to be managed. This means that the extracted semiconductor manufacturing device 2 is a device which can cause a failure (or a device related to a functional requirement) in light of its software conditions.

The hardware-condition conforming device extracting part 160 extracts a semiconductor manufacturing device 2 with a hardware condition under which a failure can occur. More specifically, the hardware-condition conforming device extracting part 160 extracts a device which conforms to a hardware condition under which a failure can occur, from the semiconductor manufacturing devices 2 to be managed. This means that the extracted semiconductor manufacturing device 2 is a device which can cause a failure in light of its hardware conditions.

The hardware-condition conforming device extracting part 160 also extracts a semiconductor manufacturing device 2 with a hardware condition that satisfies a functional requirement from software. More specifically, the hardware-condition conforming device extracting part 160 extracts a device which conforms to a hardware condition under which software can function properly, from the semiconductor manufacturing devices 2 to be managed. This means that the extracted semiconductor manufacturing device 2 is a device which satisfies a functional requirement in light of its hardware conditions.

2. Process

The process of identifying devices affected by failures and the process of identifying devices which satisfy functional requirements from software will be described.

As a precondition for the execution of the process to be described below, the software information acquisition part 110 shall have acquired the installation history information about the semiconductor manufacturing devices 2 to be managed, and the storage part 12 shall store the installation history table T1 which stores installation history information for each device.

Also, the hardware information acquisition part 120 shall have acquired update information about the hardware configurations of the semiconductor manufacturing devices 2 to be managed, and the storage part 12 shall store the hardware detailed information table T2 which stores hardware information for each device.

Still also, the failure/requirement information acquisition part 130 shall have acquired information about failures or functional requirements, and the storage part 12 shall store the failure/requirement table T3 which stores hardware conditions for each failure or requirement in association with the failure or requirement numbers.

Still also, the storage part 12 shall store the module version table T5, the application version table T6, and the version association table T7.

<2-1. Process of Identifying Range of Influence of Failure>

Figure 6:
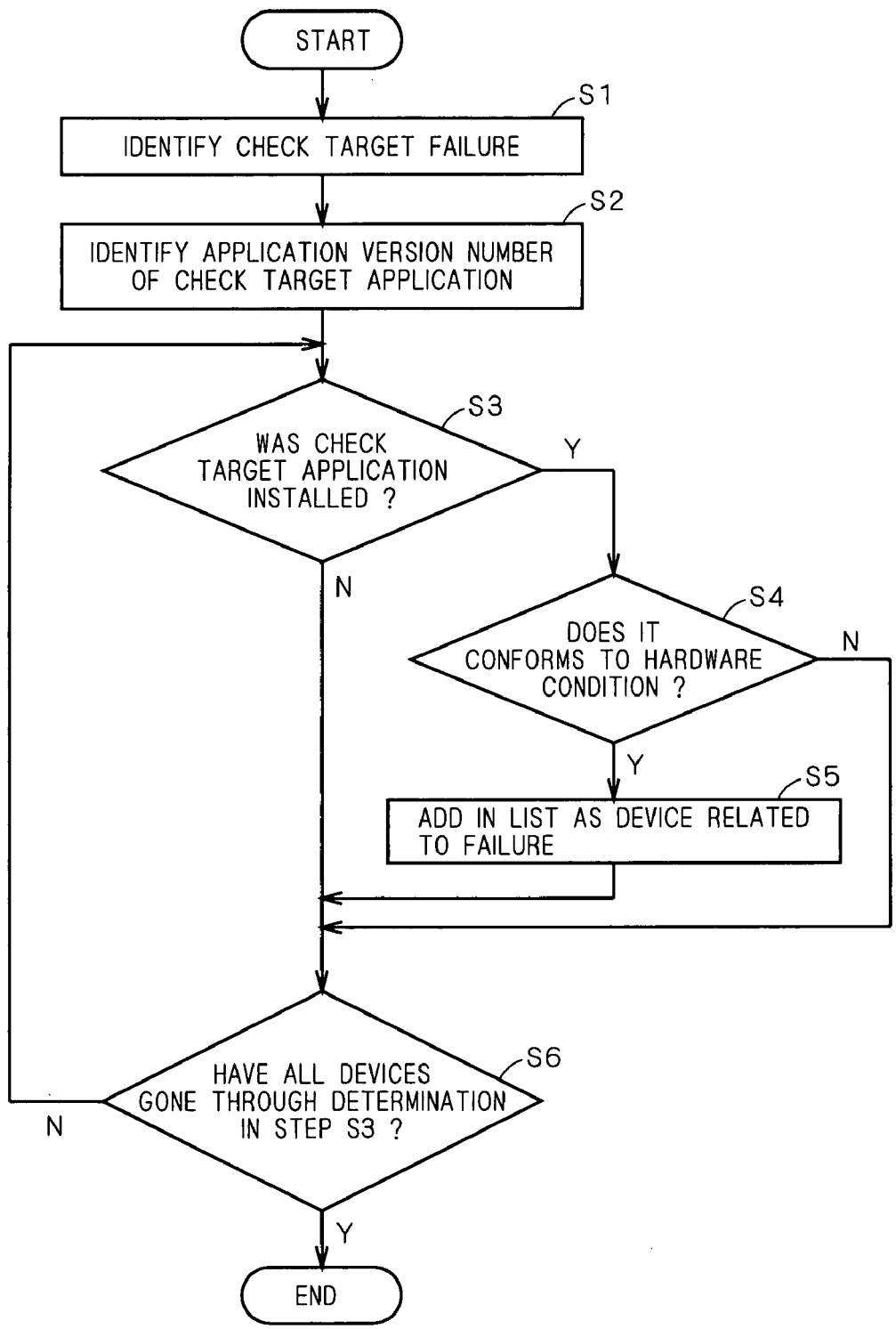
FIG. 6 is a flowchart showing the process of identifying hardware that is affected by a failure.

FIG. 6 is a flowchart showing the process of identifying hardware affected by a failure.

First, a failure to be checked (hereinafter referred to as a "check target failure") is determined (step S1). The determination of a check target failure is made by the operator inputting the failure number of a failure desired to be checked through the operating part 13 as well as by accepting that input failure number. Or the configuration may be such that a failure newly stored in the failure table T3a may automatically be determined as the check target failure.

Then, the application version identification part 140 identifies an application version number related to the check target failure (step S2).

Figure 7:
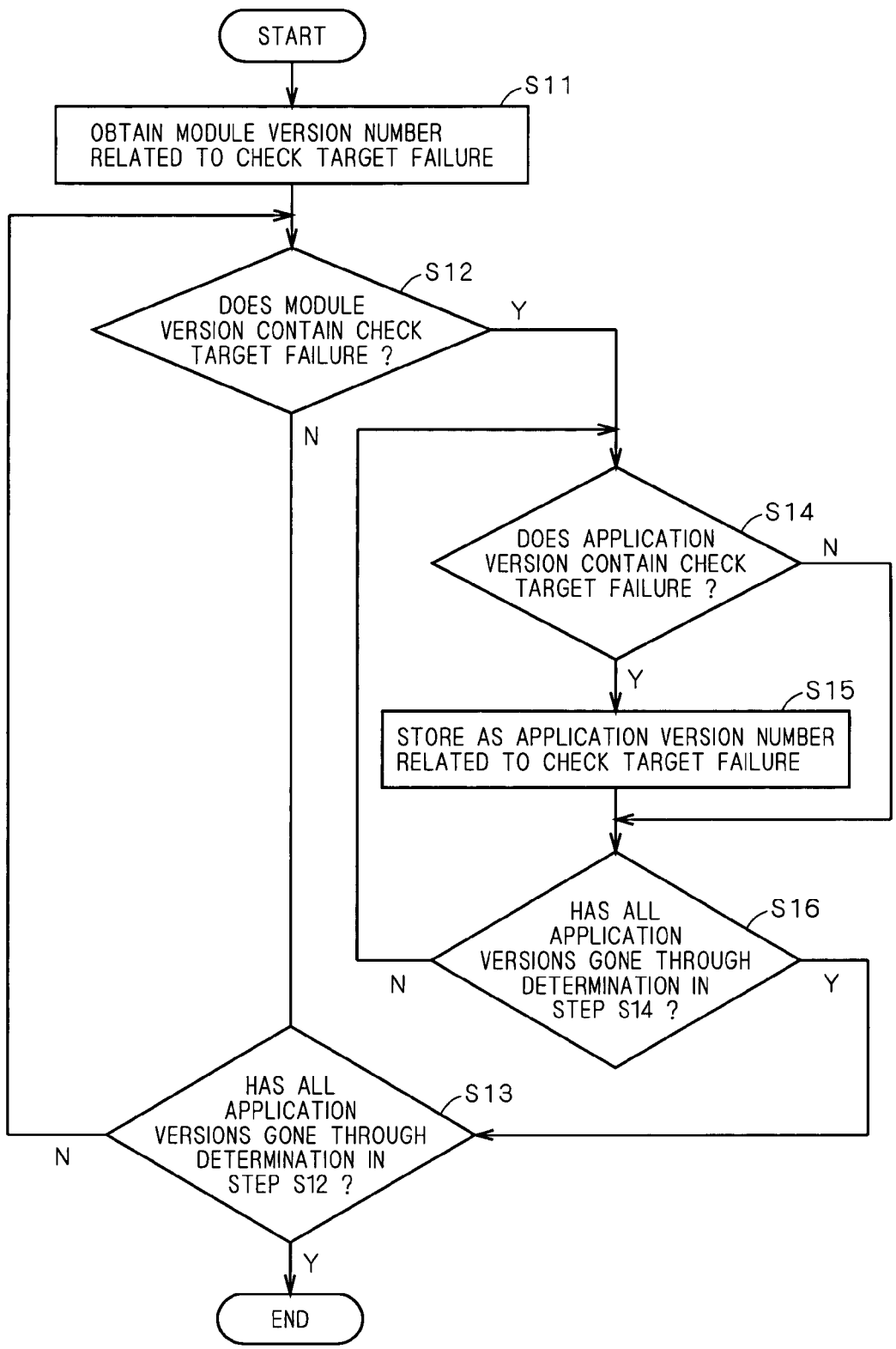
FIG. 7 is a flowchart showing the process step of identifying an application version number related to a check target failure.

A concrete description of the process in step S2 will be given with reference to FIG. 7. FIG. 7 is a flowchart showing the process in step S2.

The first step is to obtain, with reference to the failure/requirement table T3, a module version number related to the check target failure (step S11). More specifically, the failure table T3a is referred to obtain a failure-containing module version number and a failure-corrected module version number for the check target failure.

Then, one of the module versions stored in the module version table T5 is extracted to determine whether or not that module version contains the check target failure (step S12). More specifically, if the extracted module version is later than the failure-containing module version obtained in step S11 and earlier than the failure-corrected module version obtained in step S11, that module version is determined as containing a failure. The extraction of the module versions stored in the module version table T5 should preferably be made in a way of following the set memberships of the module versions. This improves the efficiency of the determination process in step S12.

In step S12, if the extracted module version is determined as not containing the check target failure, a determination is made whether or not all of the module versions stored in the module version table T5 have gone through the determination in step S12 (step S13).

If step S13 determines that there remains any module version which has not gone through the determination in step S12, the process returns again to step S12 to extract another module version for the determination process in step S12.

In step S12, if the extracted module version is determined as containing the check target failure, subsequently one of the application versions stored in the application version table T6 is extracted to determine whether or not that application version contains the check target failure (step S14). More specifically, it is determined whether or not the extracted application version includes the module version which has been determined as containing the check target failure in step S12. This determination is more specifically made as follows. The first step is to identify a module version included in the extracted application version with reference to the version association table T7. Then, it is determined whether or not the identified module version includes the module version which has been determined as containing the check target failure in step S12. The extraction of the application versions stored in the application version table T6 should preferably be made in a way of following the set memberships of the application versions. This improves the efficiency of the determination process in step S14.

In step S14, if the extracted application version is determined as containing the check target failure, the application version number of that application version is stored as an application version number related to the check target failure (step S15). Upon completion of the process in step S115, the process goes to step S16.

In step S14, if the extracted application version is determined as not containing the check target failure, the process goes to step S16 without performing step S15.

Step S16 determines whether or not all of the application versions stored in the application version table T6 have gone through the determination in step S14.

If step S16 determines that all the application versions have gone through the determination in step S14, the process goes to step S13. On the other hand, if step S16 determines that there remains any application version which has not gone through the determination in step S14, the process returns again to step S14 to extract another application version for the determination process in step S14.

If step S13 determines that all the module versions have gone through the determination in step S12, the process is completed.

Through the aforementioned process, application version numbers related to the check target failure are identified completely.

Referring back to FIG. 6, after step S2 identifies the application version number of the application related to the check target failure (hereinafter referred to as "check target application"), subsequently the software-condition conforming device extracting part 150 extracts one of the semiconductor manufacturing devices 2 to be managed as a device to be judged and determines whether or not that device is the device which has installed the check target application (which device is hereinafter referred to as a "software-condition conforming device") (step S3). More specifically, the first step is to obtain the application version number of application software now installed on the device to be judged from the installation history table T1. Then, it is determined whether or not the obtained application version number matches with the application number identified in step S3 (that is, the application version number of the check target application). And if it matches, that device to be judged is determined as the software-condition conforming device.

If step S3 determines that the device to be judged is not a software-condition conforming device, that device is determined as not being affected by a failure in light of its software conditions. In this case, the determination process for that device is completed, and the process goes to step S6.

If step S3 determines that the device to be judged is a software-condition conforming device, subsequently the hardware-condition conforming device extracting part 160 determines whether or not that device is the device which conforms to a hardware condition for the check target failure (which device is hereinafter referred to as a "hardware-condition conforming device) (step S4).

Figure 8:
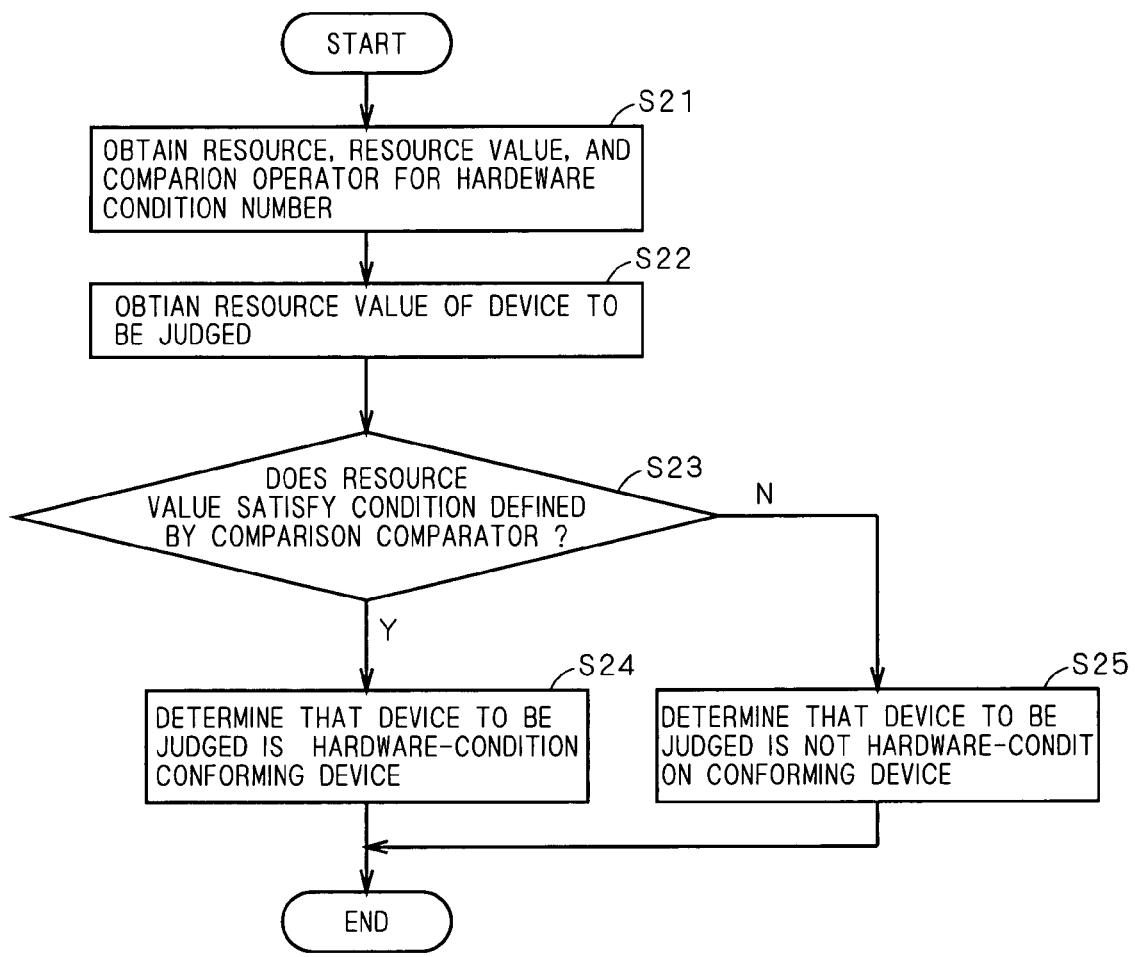
FIG. 8 is a flowchart showing the process step of determining whether or not a device to be judged is a hardware-condition conforming device.

A concrete description of the process in step S4 will be given with reference to FIG. 8. FIG. 8 is a flowchart showing the process in step S4.

The first step is to obtain the hardware condition number for the check target failure from the failure/requirement table T3 and to obtain the resource, the resource value, and the comparison operator related to that hardware condition number from the hardware condition table T4 (step S21).

Then, the hardware detailed information table T2 is referred to obtain a resource value of the device to be judged (more specifically, the resource value of the resource obtained in step S21) (step S22).

Then, it is determined whether or not the resource value of the device to be judged, which is obtained in step S22, satisfies a condition defined by the comparison operator obtained in step S21 in relation to the resource value related to the hardware condition obtained in step S21 (step S23).

If step S23 determines that the resource value of the device to be judged satisfies the condition defined by the comparison operator, the device to be judged is determined as being the hardware-condition conforming device (step S24). If not, the device to be judged is determined as not being the hardware-condition conforming device (step S25).

Through the aforementioned process, whether the device to be judged is the hardware-condition conforming device or not is determined.

Referring back to FIG. 6, if the device to be judged is determined as being the hardware-condition conforming device in step S4, it is determined that the device satisfies both the software and hardware conditions and thus is the device which is affected by the failure (which device is hereinafter referred to as a "failure-affected device"). In this case, the list forming part 170 obtains the serial number of that device to be judged and adds it to a list (step S5). This forms a list of the failure-affected devices affected by the check target failure. After completion of the process in step S5, the process goes to step S6.

In step S4, if the device to be judged is determined as not being the hardware-condition conforming device, that device is determined as the device which is not affected by the failure in light of its hardware conditions. In this case, the determination process for that device is completed, and the process goes to step S6.

Step S6 determines whether or not all the semiconductor manufacturing devices 2 to be managed have gone through the determination process in step S3. If it is determined that there remains any semiconductor manufacturing device 2 to be managed which has not gone through the determination process in step S3, the process returns again to step S3 to extract another device which has not yet gone through the determination process for the determination process in step S3. If it is determined that all the semiconductor manufacturing devices 2 to be managed have gone through the determination process in step S3, the process is completed.

Through the aforementioned process, hardware affected by the check target failure is identified.

<2-2. Process of Identifying Hardware Satisfying Functional Requirement>

Figure 9:
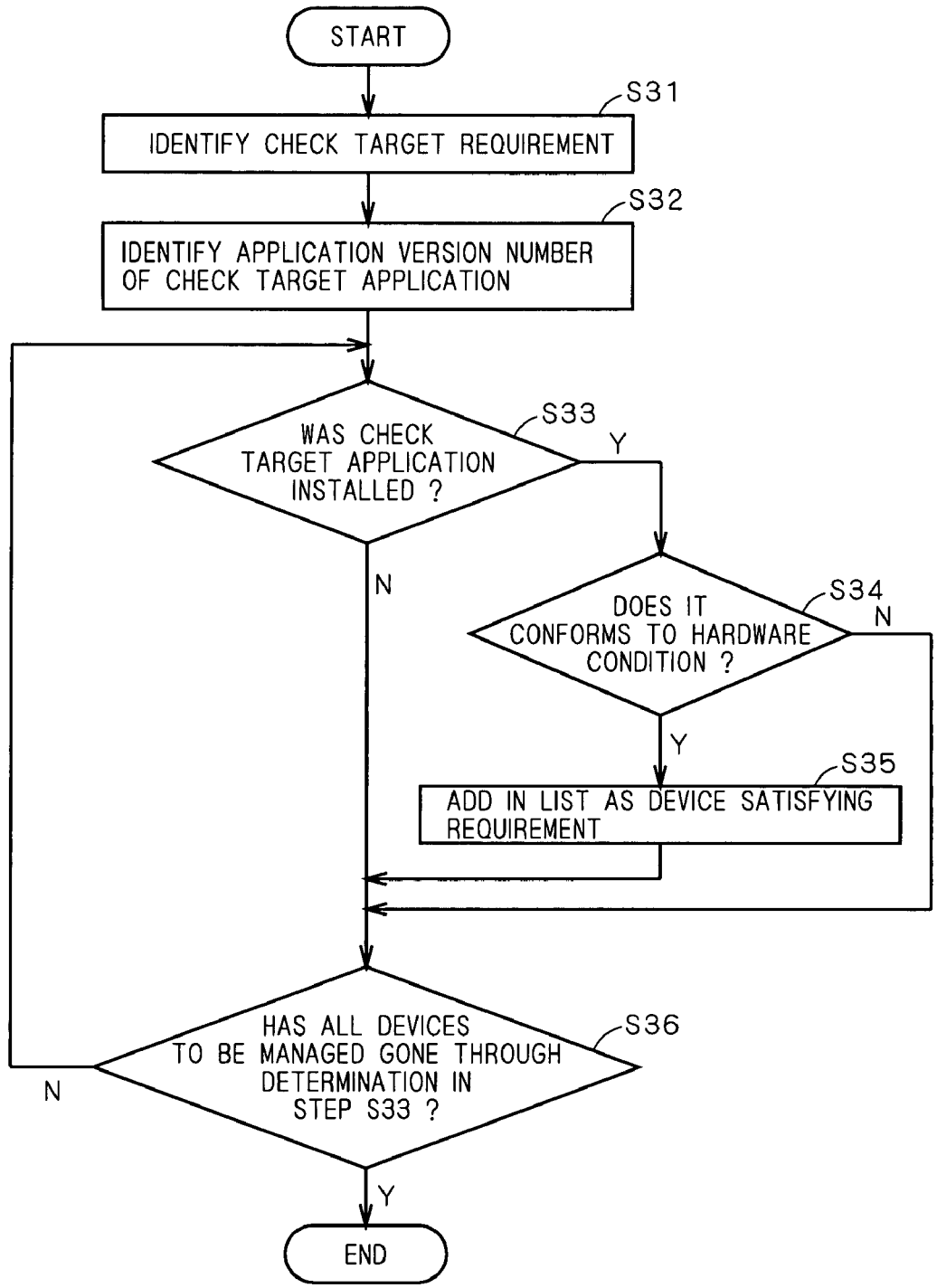
FIG. 9 is a flowchart showing the process of identifying hardware that satisfies functional requirements from software.

FIG. 9 is a flowchart showing the process of identifying hardware that satisfies a functional requirement from software.

First, a requirement to be checked (hereinafter referred to as a "check target requirement") is determined (step S31). The determination of the check target requirement is made by the operator inputting a requirement number in the requirement table T3*b* through the operating part 13 as well as by accepting that input requirement number. Or the configuration may be such that a requirement newly stored in the requirement table T3*b* may automatically be determined as the check target requirement.

Then, the application version identification part 140 identifies an application version number related to the check target requirement (step S32). The process in step S32 is identical to that in step S2 (FIG. 6). However in step S32, as the process corresponding to that in step S11 (FIG. 7), the requirement table T3*b* is referred to obtain a corresponding module version number for the check target requirement as a module version number related to the check target requirement. Also as the process corresponding to that in step S12 (FIG. 7), it is determined whether or not each of the module versions stored in the module version table T5 has the check target requirement (more specifically, the corresponding module version number for the check target requirement).

After the application version number of application related to the check target requirement (check target application version) is identified in step S32, as the next step, the software-condition conforming device extracting part 150 extracts one of the semiconductor manufacturing devices 2 to be managed as a device to be judged, and determines whether or not that device is the device which has installed the check target application (software-condition conforming device) (step S33). This process is identical to that in step S3 (FIG. 6).

If step S33 determines that the device to be judged is not the software-condition conforming device, that device is determined as not being the device related to the functional requirements in light of its software conditions. In this case, the determination process for that device is completed, and the process goes to step S36.

If the step S33 determines that the device to be judged is the software-condition conforming device, as the next step, the hardware-condition conforming device extracting part 160 determines whether or not that device is the device which conforms to the hardware conditions for the check target requirement (hardware-condition conforming device) (step S34). This process is identical to that in step S4 (FIG. 6).

If step S34 determines that the device to be judged is the hardware-condition conforming device, that device is determined as the device which is related to the function requirements in light of its hardware conditions and which satisfies the required hardware conditions (which device is hereinafter referred to as a "requirement-satisfying device"). In this case, the list forming part 170 obtains the serial number of that device to be judged and adds it to a list (step S35). This forms a list of requirement-satisfying devices related to the check target failure. After completion of the process in step S35, the process goes to step S36.

If step S34 determines that the device to be judged is not the hardware-condition conforming device, that device is determined as the device which does not satisfy the required hardware conditions. In this case, the determination process for that device is completed, and the process goes to step S36. Now, the configuration may be such that the list forming part 170 may obtain the serial number of that device to be judged and adds it to a list. In this case, the list obtained contains devices which have installed software issuing a functional requirement but which do not satisfy the functional requirement.

Step S36 determines whether or not all the semiconductor manufacturing devices 2 to be managed have gone through the determination process in step S33. This process is identical to that in step S6 (FIG. 6). Upon determination that all of the semiconductor manufacturing devices 2 to be managed have gone through the determination process in step S33, the process is completed.

Through the aforementioned process, hardware that satisfies the check target requirement is identified.

<Effect>

The traceability management apparatus 1 according to the aforementioned preferred embodiment comprises means (hardware information acquisition part 120) for, in the case of modification or addition to the hardware configurations of the semiconductor manufacturing devices 2 to be managed, acquiring the update information. Accordingly, even if the model number and the actual resource value do not correspond due to modification or addition to hardware of the semiconductor manufacturing devices 2 to be managed, the actual resource value after the modification or addition can be held as hardware information. That is, even in the case of modification or addition to hardware, traceability of devices to be managed can be ensured with reliability.

For identification of devices affected by a failure in software, the software-condition conforming device extracting part 150 first extracts software-condition conforming devices, and then the hardware-condition conforming device extracting part 160 further extracts hardware-condition conforming devices from the software-condition conforming devices. That is, the devices which satisfy both the software and hardware conditions are determined as the devices affected by a failure. This allows efficient and reliable identification of the range of influence of a failure blamed on hardware conditions. Consequently, it becomes possible to take speedy action to control damage due to a failure, thereby minimizing the damage.

For identification of devices which satisfy functional requirements from software, the software-condition conforming device extracting part 150 first extracts software-condition conforming devices, and then the hardware-condition conforming device extracting part 160 further extracts hardware-condition conforming devices from the software-condition conforming devices. That is, the devices which satisfy both the software and hardware conditions are determined as the devices satisfying functional requirements from software. This allows efficient and reliable identification of the range that can satisfy functional requirements from software.

Other Preferred Embodiments

While aimed to manage the semiconductor manufacturing devices 2 as computer devices, the traceability management apparatus 1 according to the aforementioned preferred embodiment can manage various computer devices, not limited to the semiconductor manufacturing devices 2. Especially, the traceability management apparatus 1 is effective for the management of traceability of computer devices which include hardware components that can be modified or added and which can cause inconsistency between their model numbers and actual resource values. The traceability management apparatus 1 is also effective for the management of traceability of computer devices whose update management is exercised over a communication line. Concrete examples of the devices to be managed, other than semiconductor manufacturing devices, include personal computers, DVD recorders, cellular phones, various home information equipment, and the like.

According to the aforementioned preferred embodiment, the configuration is such that, after extraction of software-condition conforming devices (step S3 in FIG. 6), hardware-condition conforming devices are extracted from the extracted software-condition conforming devices (step S4 in FIG. 6). As an alternative, the configuration may be such that after extraction of hardware-condition conforming devices, software-condition conforming devices are extracted from the extracted hardware-condition conforming devices.

While in the aforementioned preferred embodiment, the traceability management apparatus 1 is connected to each of the semiconductor manufacturing devices 2 to be managed over the network N, the traceability management apparatus 1 should not necessarily be connected to each of the semiconductor manufacturing devices 2 to be managed over the network N. In this case, the software information acquisition part 110 and the hardware information acquisition part 120 may obtain information about software or hardware of each of the semiconductor manufacturing devices 2 from various communication terminal equipment or the like that is connected over the network N, or may obtain using a transportable recording medium M (such as MO (magneto-optical disks) or CD-R/RW). For example in the case of modification or the like to software or hardware of the semiconductor manufacturing devices 2, the operator may be obligated to notify information about the modification or the like to the traceability management apparatus 1 by e-mail or the like.

The traceability management apparatus 1 according to the aforementioned preferred embodiment may further comprise means for issuing a predetermined alert message or the like to those semiconductor manufacturing devices 2 which are listed as the devices to be affected by failures.

The traceability management apparatus 1 according to the aforementioned preferred embodiment may further comprise means for teaching (or forcing) those semiconductor manufacturing devices 2 which are placed on a list of failure-affected devices, to carry out measures to be taken to avoid or eliminate a check target failure (for example, exchange of resources, or version up of software).

While the invention has been shown and described in detail, the foregoing description is in all aspects illustrative and not restrictive. It is therefore understood that numerous modifications and variations can be devised without departing from the scope of the invention.

What is claimed is:

1. A traceability management apparatus for providing traceability of a plurality of computer devices, each of the computer devices including hardware components that can be modified or added, the traceability management apparatus comprising:
a software information acquisition part for acquiring installation history of software for each of said plurality of computer devices;
a hardware information acquisition part for acquiring update information about said hardware components for each of said plurality of computer devices;
a first device extracting part for, to trace the range of influence of a failure in software, extracting one or more computer devices which each have installed software containing said failure from said plurality of computer devices; and
a second device extracting part for extracting a device which satisfies a hardware condition under which said failure occurs from the devices which have installed software containing said failure, thereby to identify a failure-affected computer device;
wherein
said hardware condition includes information identifying a type of hardware components to be conditioned, information identifying contents of said hardware components to be identified, and a comparison operator, and
said second device extracting part compares the acquired update information about said hardware components of the devices which have installed software containing said failure, the type of said acquired update information being the type of hardware components to be conditioned included in said hardware condition, with the information identifying contents of said hardware components to be identified included in said hardware condition by the comparison operator included in said hardware condition, thereby judging whether said devices which have installed software containing said failure satisfy said hardware condition or not.

2. A traceability management apparatus for providing traceability of a plurality of computer devices, each of the computer devices including hardware components that can be modified or added, the traceability management apparatus comprising:
a software information acquisition part for acquiring installation history of software for each of said plurality of computer devices;
a hardware information acquisition part for acquiring update information about said hardware components for each of said plurality of computer devices;
a first device extracting part for, to trace the range that satisfies a functional requirement from software, extracting one or more computer devices which each have installed software related to said functional requirement from said plurality of computer devices; and
a second device extracting part for extracting a device which satisfies a hardware condition required by said software from the devices which have installed software related to said functional requirements, thereby to identify a requirement-satisfying computer device;
wherein
said hardware condition includes information identifying a type of hardware components to be conditioned, information identifying contents of said hardware components to be identified, and a comparison operator, and said second device extracting part compares the acquired update information about said hardware components of the devices which have installed software related to said functional requirements, the type of said acquired update information being the type of hardware components to be conditioned included in said hardware condition, with the information identifying contents of said hardware components to be identified included in said hardware condition by the comparison operator included in said hardware condition, thereby judging whether said devices which have installed software related to said functional requirements satisfy said hardware condition or not.

3. A computer-readable storage medium storing a program for a traceability management apparatus for providing traceability of a plurality of computer devices each of the computer devices including hardware components that can be modified or added, said traceability management apparatus comprising the following by execution of said program:
   a software information acquisition part for acquiring installation history of software for each of said plurality of computer devices;
   a hardware information acquisition part for acquiring update information about said hardware components for each of said plurality of computer devices;
   a first device extracting part for, to trace the range of influence of a failure in software, extracting one or more computer devices which each have installed software containing said failure from said plurality of computer devices; and
   a second device extracting part for extracting a device which satisfies a hardware condition under which said failure occurs from the devices which have installed software containing said failure, thereby to identify a failure-affected computer device;
wherein
said hardware condition includes information identifying a type of hardware components to be conditioned, information identifying contents of said hardware components to be identified, and a comparison operator, and
said second device extracting part compares the acquired update information about said hardware components of the devices which have installed software containing said failure, the type of said acquired update information being the type of hardware components to be conditioned included in said hardware condition, with the information identifying contents of said hardware components to be identified included in said hardware condition by the comparison operator included in said hardware condition, thereby judging whether said devices which have installed software containing said failure satisfy said hardware condition or not.

4. A computer-readable storage medium storing a program for a traceability management apparatus for providing traceability of a plurality of computer devices, each of the computer devices including hardware components that can be modified or added, said traceability management apparatus comprising the following by execution of said program:
   a software information acquisition part for acquiring installation history of software for each of said plurality of computer devices;
   a hardware information acquisition part for acquiring update information about said hardware components for each of said plurality of computer devices;
   a first device extracting part for, to trace the range that satisfies a functional requirement from software, extracting one or more computer devices which each have installed software related to said functional requirement from said plurality of computer devices; and
   a second device extracting part for extracting a device which satisfies a hardware condition required by said software from the devices which have installed software related to said functional requirement, thereby to identify a requirement-satisfying computer device;
wherein
said hardware condition includes information identifying a type of hardware components to be conditioned, information identifying contents of said hardware components to be identified, and a comparison operator, and
said second device extracting part compares the acquired update information about said hardware components of the devices which have installed software related to said functional requirements, the type of said acquired update information being the type of hardware components to be conditioned included in said hardware condition, with the information identifying contents of said hardware components to be identified included in said hardware condition by the comparison operator included in said hardware condition, thereby judging whether said devices which have installed software related to said functional requirements satisfy said hardware condition or not.

5. A tracing method for tracing a failure in software that is installed on a plurality of computer devices, each of the computer devices including hardware components that can be modified or added, the tracing method comprising the steps of:
   a) acquiring installation history of said software for each of said plurality of computer devices;
   b) acquiring update information about said hardware components for each of said plurality of computer devices;
   c) extracting one or more computer devices which each have installed software containing said failure from said plurality of computer devices; and
   d) extracting a device which satisfies a hardware condition under which said failure occurs, from the devices extracted in said step c);
wherein
said hardware condition includes information identifying a type of hardware components to be conditioned, information identifying contents of said hardware components to be identified, and a comparison operator, and
in step d), comparing the acquired update information about the devices extracted in step c), the type of said acquired update information being the type of hardware components to be conditioned included in said hardware condition, with the information identifying contents of said hardware components to be identified included in said hardware condition by the comparison operator included in said hardware condition, thereby judging whether said devices extracted in step c) satisfy said hardware condition or not.

6. A tracing method for tracing a functional requirement from software that is installed on a plurality of computer devices, each of the computer devices including hardware components that can be modified or added, the tracing method comprising the steps of:
   a) acquiring installation history of said software for each of said plurality of computer devices;
   b) acquiring update information about said hardware components for each of said plurality of computer devices;

c) extracting one or more computer devices which each have installed software related to said functional requirement from said plurality of computer devices; and d) extracting a device which satisfies a hardware condition required by said software from the devices extracted in said step c);

wherein said hardware condition includes information identifying a type of hardware components to be conditioned, information identifying contents of said hardware components to be identified, and a comparison operator, and in step d), comparing the acquired update information about the devices extracted in step c), the type of said acquired update information being the type of hardware components to be conditioned included in said hardware condition, with the information identifying contents of said hardware components to be identified included in said hardware condition by the comparison operator identified in said hardware condition, thereby judging whether said devices extracted in step c) satisfy said hardware condition or not.

* * * * *